United States Patent
Ushirokawa et al.

[11] Patent Number: 5,228,058
[45] Date of Patent: Jul. 13, 1993

[54] ADAPTIVE EQUALIZER

[75] Inventors: Akihisa Ushirokawa; Ichiro Tsujimoto, both of Tokyo, Japan

[73] Assignee: NEC Corporation, Tokyo, Japan

[21] Appl. No.: 731,480

[22] Filed: Jul. 17, 1991

[30] Foreign Application Priority Data

Jul. 17, 1990 [JP] Japan .................................. 2-188320

[51] Int. Cl.⁵ .............................................. H04B 3/06
[52] U.S. Cl. .................................... 375/14; 364/724.2
[58] Field of Search ........................ 375/11, 12, 13, 14; 364/724.19, 724.20; 333/18, 28 R

[56] References Cited

U.S. PATENT DOCUMENTS

| | | | |
|---|---|---|---|
| 3,875,515 | 4/1975 | Stuart et al. | 375/14 |
| 4,905,254 | 2/1990 | Bergmans | 375/14 |
| 5,020,078 | 5/1991 | Crespo | 375/14 |

Primary Examiner—Curtis Kuntz
Assistant Examiner—Vijay Shankar
Attorney, Agent, or Firm—Foley & Lardner

[57] ABSTRACT

An adaptive equalizer for adaptively equalizing a signal received over a channel on which intersymbol interference occurs. The adaptive equalizer accurately updates the tap coefficients of a transversal filter incorporated therein in a predetermined period of time without fail with no regard to the intersymbol interference on the channel.

3 Claims, 7 Drawing Sheets

ADAPTIVE EQUALIZER

BACKGROUND OF THE INVENTION

The present invention relates to an adaptive equalizer incorporated in a receiver of the type receiving digital signals over a transmission channel which suffers from intersymbol interference for adaptively equalizing the received signals.

It has been customary with an adaptive equalizer to update the tap coefficients of a transversal filter incorporated therein such that mean-square error (MSE) or the maximum value of the difference between the received signal and the output of the equalizer becomes minimum.

The problem with the above-described conventional adaptive equalizer is that when the eigenvalues of the autocorrelation function matrix R of received signals decrease under a particular channel intersymbol interference condition, the convergence of the tap coefficients of the transversal filter included in the equalizer is extremely slow.

SUMMARY OF THE INVENTION

It is therefore an object of the present invention to provide an adaptive equalizer capable of accurately updating the tap coefficients of a transversal filter incorporated therein in a predetermined period of time at all times with no regard to intersymbol interference condition of the channel.

It is another object of the present invention to provide a generally improved adaptive equalizer.

In accordance with the present invention, an adaptive equalizer for adaptively equalizing a signal received over a channel on which intersymbol interference occurs comprises an adaptive equalizing circuit comprising a transversal filter and receiving the received signal, a channel impulse response estimating circuit for estimating an impulse response of the channel on the basis of the output of the adaptive equalizing circuit and the received signal, and a normal equation solving circuit for solving a normal equation determined by the channel impulse response estimated by the channel impulse response estimating circuit tap coefficients of the transversal filter of the adaptive equalizing circuit. The tap coefficients of the transversal filter are updated by solutions of tap coefficients determined by the normal equation solving circuit.

Also, in accordance with the present invention, an adaptive equalizer for adaptively equalizing a signal received over a channel on which intersymbol interference occurs comprises an adaptive equalizing circuit comprising a transversal filter and receiving the received signals, a training sequence generating circuit for generating a predetermined training sequence, a switching circuit responsive to the training sequence and the output signal of the adaptive equalizing circuit for outputting the training sequence during training or the output signal of the adaptive equalizing circuit after training, a channel impulse response estimating circuit for estimating an impulse response of the channel on the basis of the output signal of the switching circuit and the received signal, and a normal equation solving circuit for solving a normal equation determined by the channel impulse response estimated by the channel impulse response estimating circuit and tap coefficients of the transversal filter of the adaptive equalizing circuit. The tap coefficients of the transversal filter are updated by solutions of tap coefficients determined by the normal equation solving circuit.

Further, in accordance with the present invention, an adaptive equalizer for adaptively equalizing a signal received over a channel on which intersymbol interference occurs comprises an adaptive equalizing circuit comprising a transversal filter and receiving the received signals, a training sequence generating circuit for generating a predetermined training sequence, a switching circuit responsive to the training sequence and the output signal of the adaptive equalizing circuit for outputting the training sequence during training or the output signal of the adaptive equalizing circuit after training, a channel impulse response estimating circuit for estimating an impulse response of the channel on the basis of the output signal of the switching circuit and the received signal, a thinning circuit for sampling channel impulse responses output by the channel impulse response estimating circuit at a time interval $T_1$ which is longer than a symbol interval T, and a normal equation solving circuit for solving within the time interval $T_1$ a normal equation determined by the channel impulse response output by the thinning circuit and tap coefficients of the transversal filter of the adaptive equalizing circuit. The tap coefficients of the transversal filter are updated each time interval $T_1$ by solutions of tap coefficients determined by the normal equation solving circuit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 7:
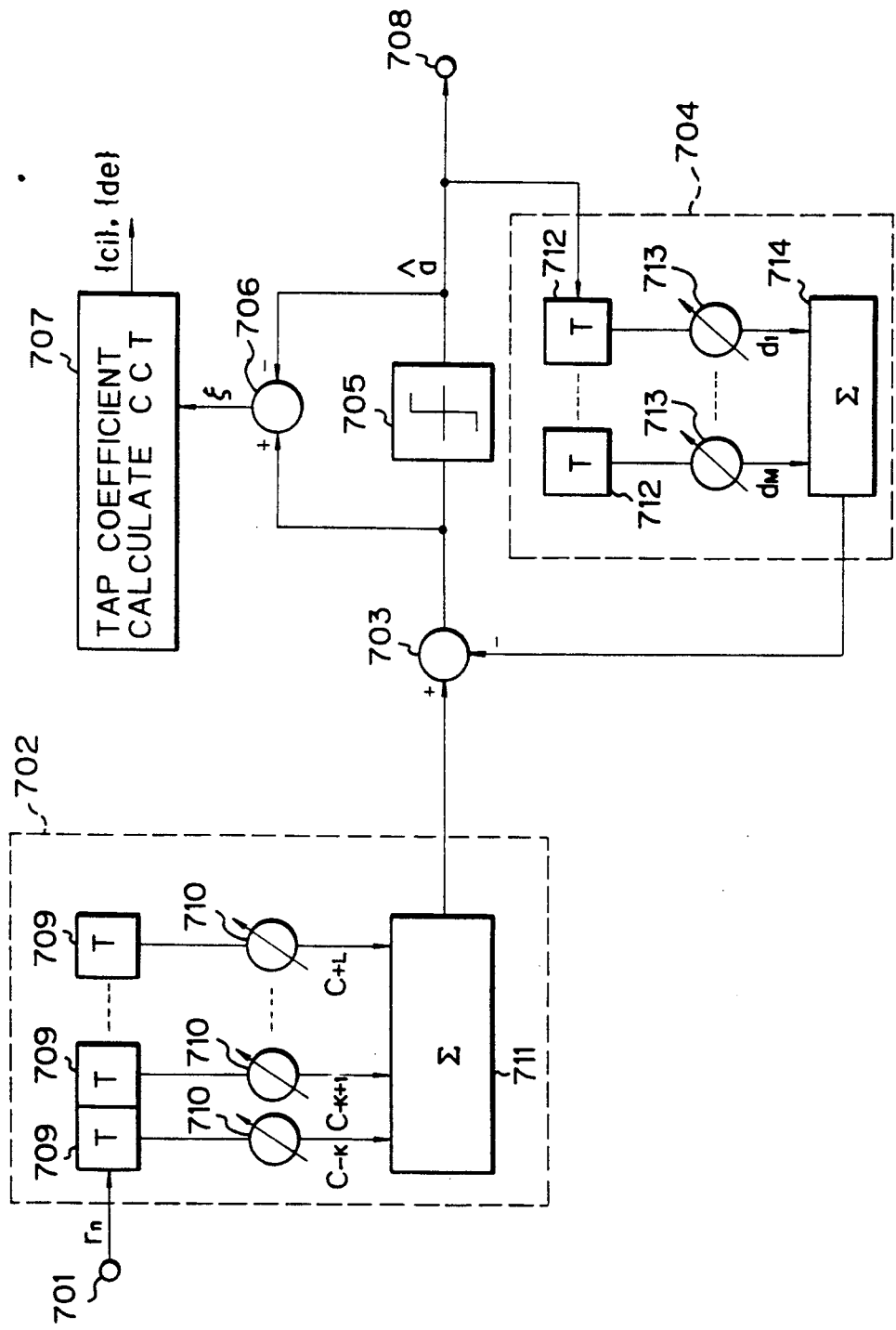
FIG. 7 is a block diagram schematically showing a conventional DFE.

To better understand the present invention, a reference will be made to a conventional adaptive equalizer. It has been customary with an adaptive equalizer to update the tap coefficients of a transversal filter incorporated in the equalizer such that mean-square error (MSE) or the maximum value of the difference between the received signal and the output of the equalizer becomes minimum. FIG. 7 shows a DFE (Decision-Feedback Equalizer) which is a specific form of such a conventional adaptive equalizer.

In FIG. 7, the DFE has a forward equalizer (FE) 702, a backward equalizer (BE) 704, and a decision unit 705. The FE 702 is made up of (K+L+1) tap coefficient multipliers 710 (hereinafter denoted by $c_i$ ($i = -K, \ldots, L$)), a delay 709, and an adder 711. The BE 704 is constituted by M tap coefficient multipliers 702 (hereinafter $d_l$ ($l = 1, \ldots, M$)), a delay 712, and an adder 714. The DFE further has substractors 703 and 706, a tap coefficient calculating circuit 707, an input terminal 701, and an output terminal 708.

Generally, the intersymbol interference particular to a transmission channel can be expressed by use of the impulse response of the channel. Assuming that the symbol sequence to be transmitted is $\{a_n\}$ ($n = -\infty, \ldots, +\infty$), and that the discrete values of the channel impulse response are $\{h_k\}$, then the sampled value $r_n$ of the received signal transferred from the input terminal 701 to the FE 702 is expressed as:

$$r_n = \sum_{k=-\infty}^{+\infty} a_k h_{n-k} \qquad \text{Eq. (1)}$$

While the following description assumes that the channel impulse response are real, the same is true with complex. When the decision output of the DFE is $\hat{a}_n$, the sampled value $r_n$ is positioned at the center tap $c_o$ of the FE 702 while sampled values $r_{n+k}, \ldots, r_o, \ldots, r_{n+L}$ are sequentially distributed on the other taps of the FE 702 in this order from the input side to the outside side. Therefore, $y_n$ inputted to the decision unit 705 is produced by:

$$y_n = \sum_{i=-K}^{+L} r_{n-1} C_i - \sum_{i=1}^{M} \hat{a}_{n-i} d_i \qquad \text{Eq. (2)}$$

The error signal $\epsilon_n$ between the input and output of the decision unit 705 is represented by:

$$\epsilon_n = Y_n - \hat{a}_n \qquad \text{Eq. (3)}$$

To allow such as DFE to satisfy the least mean square error (LMSE) condition, it is necessary that the tap coefficients of the FE 702 and BE 704 be so set as to minimize the means square $\xi = E[\epsilon_n^2]$ (E being an operator having an expected value) of the error signal $\epsilon_n$ in the Eq. (3). It follows that the tap coefficients of the FE 702 and those of the BE 704 should be selected to make the partial differentiation value of $\xi$ by the tap coefficients zero, as follows:

$$\frac{\partial \xi}{\partial c_i} = 0 \ (i = -K, \ldots, 0, \ldots, +L), \qquad \text{Eq. (4)}$$

$$\frac{\partial \xi}{\partial d_l} = 0 \ (l = 1, 2, \ldots, M)$$

Assume that the symbol sequence $\{a_n\}$ is generated in an independent and identical probability distribution (i.i.d), and that ideally the decision outputs of the DFE are identical with the symbol sequence $\{a_n\}$. The Eq. (4) may be expressed by a matrix:

$$\begin{bmatrix} R & -H \\ -H^T & I \end{bmatrix} \begin{bmatrix} c_{opt} \\ d_{opt} \end{bmatrix} = \begin{bmatrix} H_0 \\ 0 \end{bmatrix} \qquad \text{Eq. (5)}$$

The above Eq. (5) is usually referred to as the normal equation or the Wiener-Hopf equation, as described by Cowan and Grant in "ADAPTIVE FILTERS", Prentice-Hall, Inc., 1985. In the Eq. (5), T represents matrix transposition, and the tap coefficients are given by the following tap coefficient vectors:

$$c_{opt}^T = [c_{-K}, \ldots, c_o, \ldots, c_{+L}] \qquad \text{Eq. (6)}$$

$$d_{opt}^T = [d_1, \ldots, d_M] \qquad \text{Eq. (7)}$$

In the left term of the Eq. (5), the matrix (N+M)×(N+M) including submatrices R is the correlation matrix for the entire DFE. Here, $$R = \begin{bmatrix} R_{-K-K} & R_{-K-K+1} & \cdots & R_{-K+L} \\ R_{-K+1-K} & R_{-K+1-K+1} & \cdots & R_{-K+1+L} \\ \vdots & & & \vdots \\ & & R_{ij} & \\ \vdots & & & \vdots \\ R_{+L-K} & R_{+L-K+1} & \cdots & R_{+L+L} \end{bmatrix} \qquad \text{Eq. (8)}$$

where $$R_{ij} = E[r_{n-1} r_{n-j}] \qquad \text{Eq. (9)}$$

$$H_0 = [E[r_{n+k} a_n] \cdots E[r_{n-L} a_n]]^T \qquad \text{Eq. (10)}$$

$$H = \begin{bmatrix} E[r_{n+K} a_{n-1}] & \cdots & E[r_{n+K} a_{n-M}] \\ \vdots & & \vdots \\ E[r_{n-L} a_{n-1}] & \cdots & E[r_{n-L} a_{n-M}] \end{bmatrix} \qquad \text{Eq. (11)}$$

The updating of tap coefficients for adaptive equalization is often implemented by the LMS algorithm, as follows:

$$c_i(n+1) = c_i(n) - \mu \epsilon_n r_{n-1} \qquad \text{Eq. (12)}$$
$$(i = -K, \ldots, 0, \ldots, +L)$$
$$d_l(n+1) = d_l(n) - \nu \epsilon_n a_{n-1} \qquad \text{Eq. (13)}$$
$$(l = 1, \ldots, M)$$

Let it be assumed that the tap coefficient set $\{c_i(n)\}$ and $\{d_l(n)\}$ at a time nT is sequentially calculated symbol by symbol on the basis of the difference $\epsilon_n$ between the input and output of the decision unit 705, FIG. 7. When the step-size is set in the convergence range, the tap coefficients derived from the LMS algorithm converge to the solution of the Eq. (5). Assuming that the time necessary for convergence is $t_{conv}$, then the time $t_{conv}$ and the minimum value $\lambda_{min}$ of the eigenvalues of the autocorrelation function matrix R of received signals are related as follows:

$$t_{conv} \propto \frac{1}{\lambda_{min}} \qquad \text{Eq. (14)}$$

as also taught by Cowan and Grant in previously mentioned "ADAPTIVE FILTER".

The problem with the above-described conventional adaptive equalizer is that when the eigenvalues of the autocorrelation function matrix R of received signals decrease under a particular channel intersymbol interference condition, the convergence of the tap coefficients of the transversal filter included in the equalizer is extremely slow, as indicated by the Eq. (14).

Preferred embodiments of the adaptive equalizer in accordance with the present invention will be described hereinafter.

A first type of adaptive equalizer according to the present invention which will be described updates the tap coefficients of the transversal filter on the basis of the solution of the tap coefficients having been determined by the direct solution of a normal equation and not on the basis of the error signal $\epsilon$ particular to the conventional equalizer. Further, in the event of the direct solution of a normal equation, the first type of adaptive equalizer estimates a channel impulse response.

When the received signal $r_n$ is denoted by a channel impulse response $\{h_k\}$ and a transmitted symbol sequence $a_n$, as represented by the Eq. (1), the normal Eq. (5) may be rewritten as follows:

$$\begin{bmatrix} A & -H \\ -H^T & I \end{bmatrix} \begin{bmatrix} c_{opt} \\ d_{opt} \end{bmatrix} = \begin{bmatrix} H_0 \\ 0 \end{bmatrix} \quad \text{Eq. (15)}$$

In the Eq. (15), matrices A, H and $H_o$ each may be denoted only by the channel impulse response $\{h_k\}$:

$$A = \begin{bmatrix} a_{-K-K} & a_{-K-K+1} & \cdots & a_{-K+L} \\ a_{-K+1-K} & a_{-K+1-K+1} & \cdots & a_{-K+1+L} \\ \vdots & & a_{ij} & \vdots \\ a_{+L-K} & a_{+L-K+1} & \cdots & a_{+L+L} \end{bmatrix} \quad \text{Eq. (16)}$$

where $$a_{ij} = \sum_{n=-\infty}^{+\infty} h_{n-1} h_{n-j} \quad \text{Eq. (17)}$$

$$H_o = [h_{+K} \ldots h_{-L}]^T \quad \text{Eq. (18)}$$

$$H = \begin{bmatrix} h_{+K+1} & \cdots & h_{+K+M} \\ \vdots & & \vdots \\ h_{-L+1} & \cdots & h_{-L+M} \end{bmatrix} \quad \text{Eq. (19)}$$

Therefore, the normal Eq. (15) can be represented only by the channel impulse response and the tap coefficients of the adaptive equalizing circuit. It follows that if the channel impulse response can be estimated by an impulse response estimating circuit, it is possible to determine the tap coefficients of the adaptive equalizing circuit by the direct solution of the normal equation. This is the principle underlying the first type of adaptive equalizer of the present invention.

The impulse response $\{h_k\}$ can be determined by any of the following specific procedures 1) and 2) which use a received signal $r_n$ and an output signal $â_n$:

1) Procedure implemented with the correlation between the received signal and the output signal of the adaptive equalizing circuit, i.e., $E[r_1 \cdot â_n] \simeq E[r_1 \cdot â] = h_{1-n}$ which stems from the fact that a symbol sequence $\{a_n\}$ occurs under an independent and identical probability distribution (i.i.d); and 2) Procedure wherein a transversal filter receives the output of the adaptive equalizing circuit and generates the replica of a received signal, and the impulse response is calculated on the basis of the difference between the input signal and the received signal.

The above procedures 1) and 2) concretely implement a channel impulse response estimating circuit.

Figure 1:
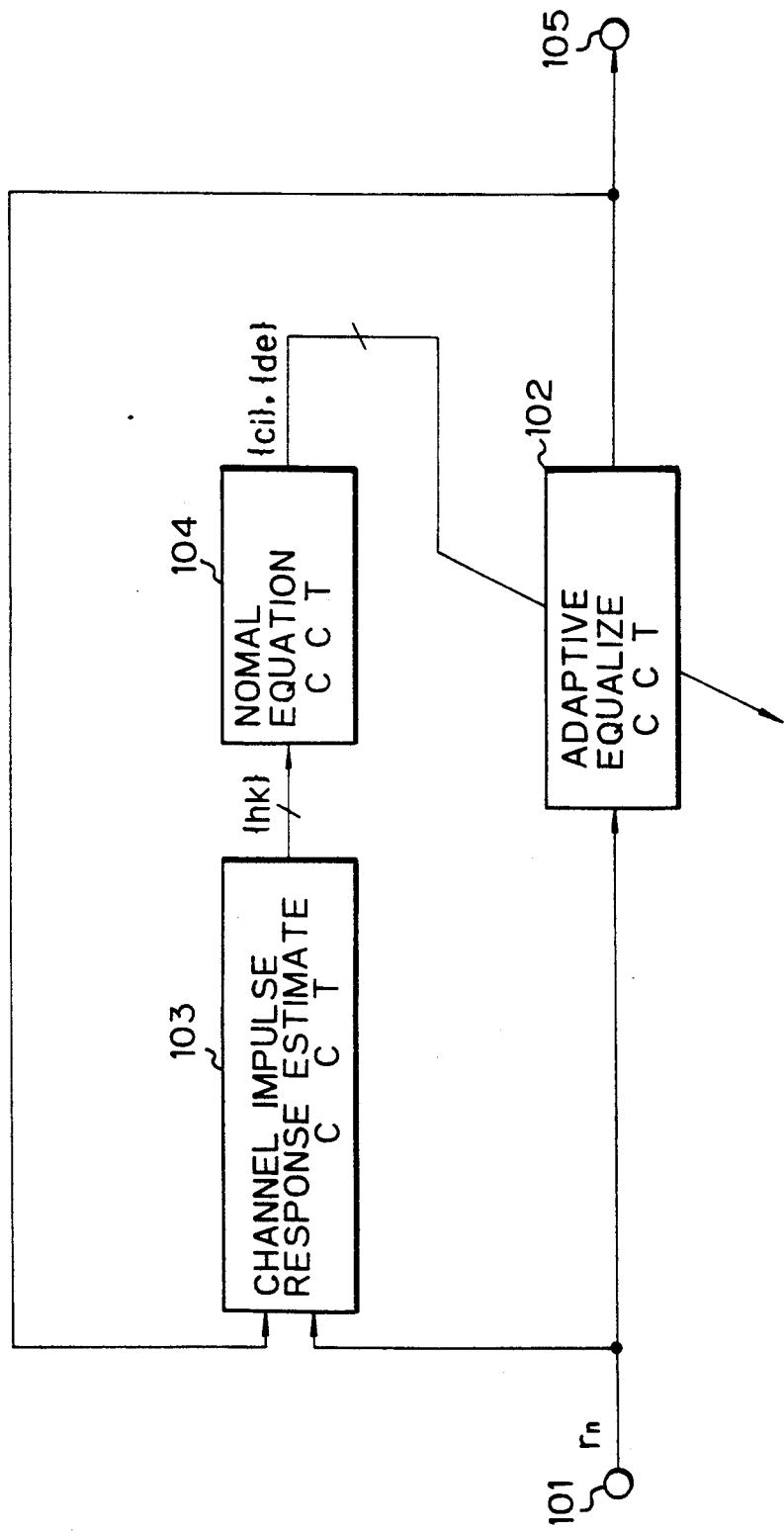
FIG. 1 is a block diagram schematically showing an embodiment of a first type of adaptive equalizer in accordance with the present invention.

Referring to FIG. 1, a preferred embodiment of the first type of adaptive equalizer in accordance with the present invention is shown. As shown, the adaptive equalizer has an input terminal 101, an adaptive equalizing circuit 102, a channel impulse response estimating circuit 103, a normal equation circuit 104, and an output terminal 105. The adaptive equalizing circuit 102 is implemented as the DFE shown in FIG. 7. Received signals coming in through the input terminal 101 are applied to the adaptive equalizing circuit 102 and channel impulse response estimating circuit 103. The equalizing circuit 102 adaptively equalizes the input signal by use of the LMS algorithm or similar algorithm for adaptive equalization. The output signal of the equalizing circuit 102 is fed to the output terminal 105 and one input terminal of the channel impulse response estimating circuit 103. The channel impulse response estimating circuit 103 estimates a channel impulse response sequence $\{h_k\}$ in response to the received signals and the output signals of the equalizing circuit 102. Receiving the estimated channel impulse response sequence $\{h_k\}$, the normal equation circuit 104 solves the Eq. (15) to thereby produce the tap coefficients $\{c_i\}$ and $\{d_l\}$ of the equalizing circuit 102. The resulting tap coefficients $\{c_i\}$ and $\{d_l\}$ are sequentially set in the equalizing circuit 102, insuring stable adaptive equalization.

Figure 2:
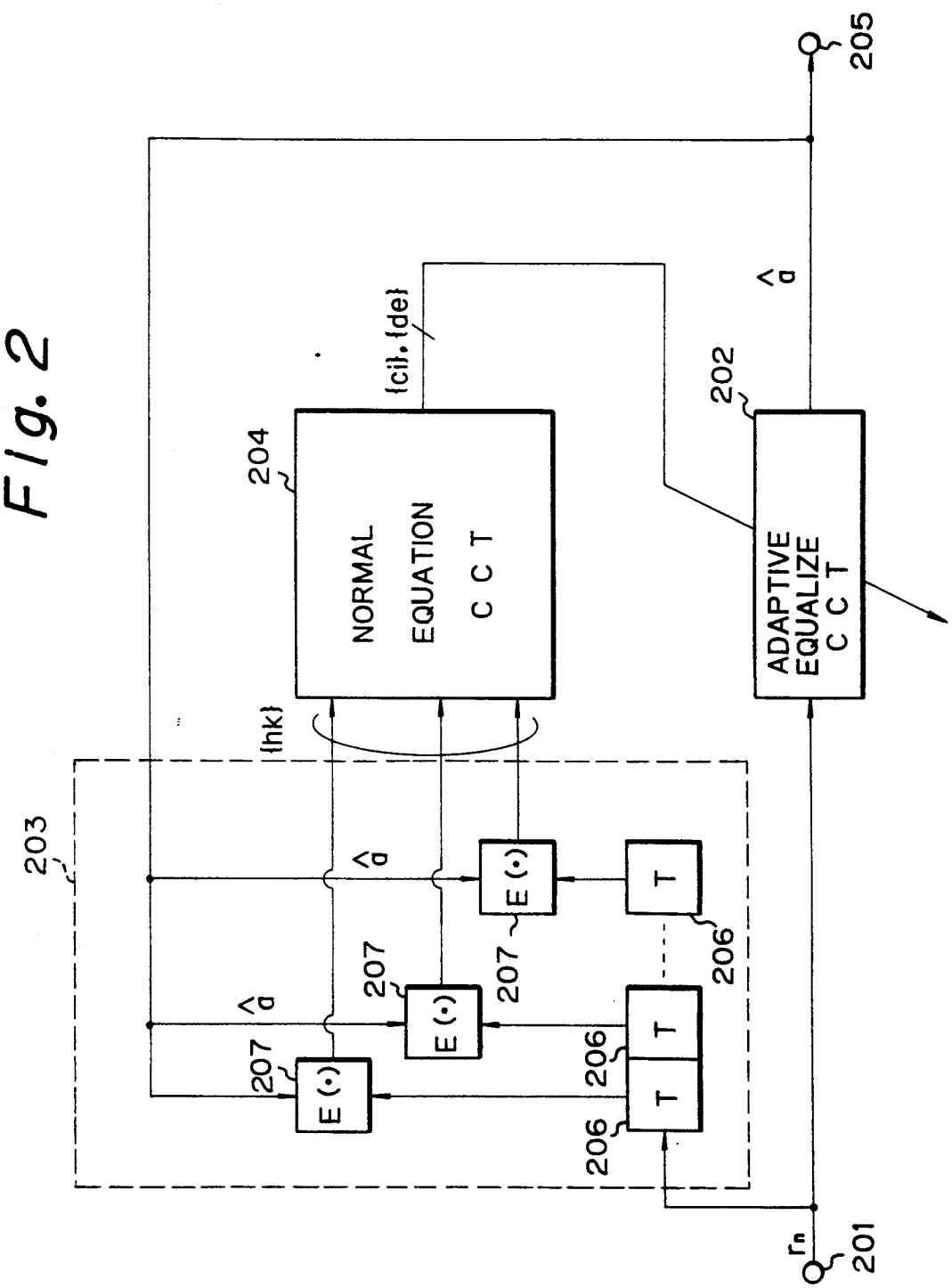
FIG. 2 is a block diagram schematically showing an alternative embodiment of the first type of adaptive equalizer.

FIG. 2 shows an alternative embodiment of the present invention which also pertains to the first type of adaptive equalizer. This embodiment, like the embodiment of FIG. 1, has an input terminal 201, an adaptive equalizing circuit 202, a normal equation circuit 204, and an output terminal 205. The difference is that this embodiment has a correlation circuit 203 in place of the impulse response estimating circuit 103. The correlation circuit 203 is made up of a group of delay elements 206 and a group of correlators 207. Received signals are delivered to the adaptive equalizing circuit 202 and the group of delay elements 206. The correlators 207 each calculates a correlation between the received signal $r_1$ having been delayed by associated one of the delay elements 206 and the output signal $â_n$ of the equalizing circuit 202. As a result, a channel impulse response sequence $\{h_k\}$ is estimated. The rest of the operation is the same as the embodiment shown in FIG. 1.

Figure 3:
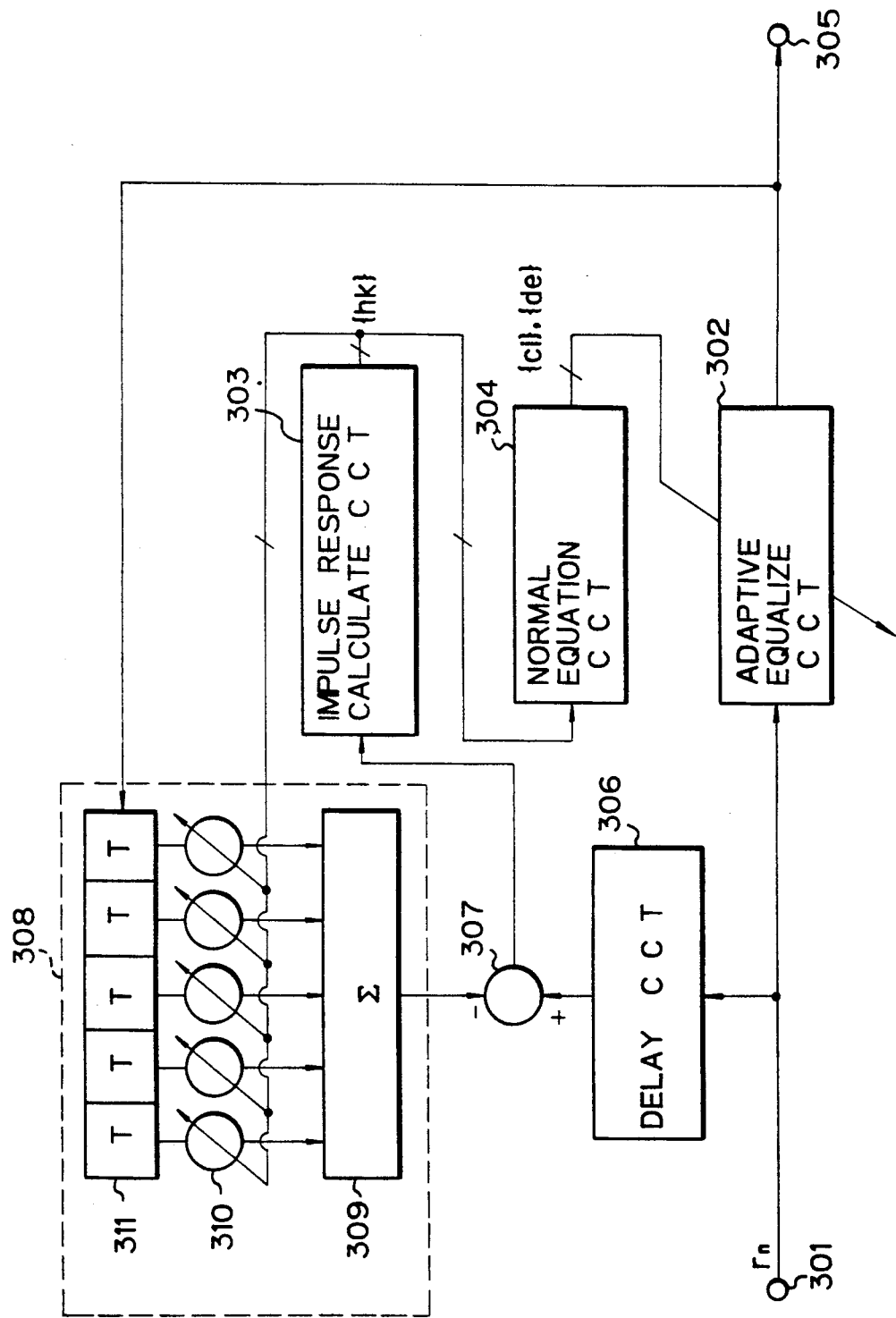
FIG. 3 is a block diagram schematically showing another alternative embodiment of the first type of adaptive equalizer.

FIG. 3 shows another alternative embodiment of the first type of adaptive equalizer of the present invention. This embodiment also has an input terminal 301, an adaptive equalizing circuit 302, a normal equation circuit 304, and an output terminal 305. In the illustrative embodiment, the channel impulse response estimating circuit 103, FIG. 1, is implemented by circuitry consisting of an impulse response calculating circuit 303, a replica generating circuit 308, a subtractor 307, and a delay circuit 306. The replica generating circuit 308 is a transversal filter made up of delay elements 311, tap coefficient multipliers 310, and an adder 309. The tap coefficient multipliers 310 multiply the output signals of the adaptive equalizing circuit 302 by the estimated channel impulse response sequence {h$_k$} determined by the impulse response calculating circuit 303. The adder 309 sums the results of multiplications fed thereto from the multipliers 310, thereby producing the replica of a received signal. The delay circuit 306 delays the received signal by the processing time particular to the replica generating circuit 308 and thereby feeds a received signal corresponding in time to the replica to the subtractor 307. The impulse response calculating circuit 303 sequentially updates the estimated channel impulse response on the basis of the difference or error between the received signal and the replica thereof having been produced by the subtractor 307.

When the decision output error is not rare due to substantial noise on the channel, the channel impulse response estimating circuit of any one of the embodiments is apt to erroneously estimate the channel impulse response to thereby increase the initial convergence time of the adaptive equalizing circuit. This problem will be eliminated if the sender sends a known fixed pattern, i.e., a training sequence, and the receiver tunes the adaptive equalizing circuit while receiving it in order to stabilize the initial convergence. A second type of adaptive equalizer of the present invention which will be described has a training sequence generating circuit.

Figure 4:
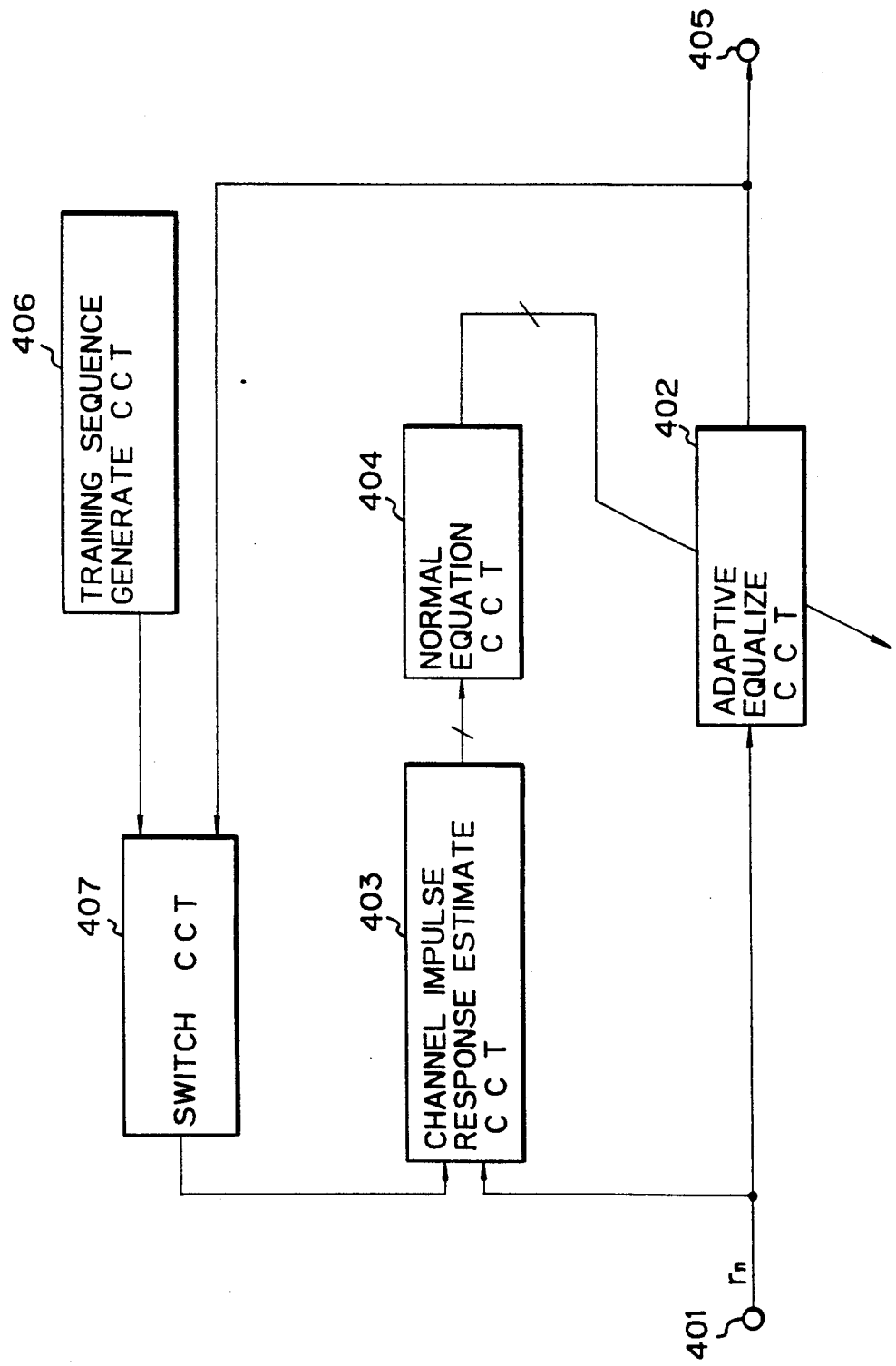
FIG. 4 is a block diagram schematically showing an embodiment of a second type of adaptive equalizer in accordance with the present invention.

Referring to FIG. 4, an embodiment of the second type of adaptive equalizer of the present invention is shown. As shown, the adaptive equalizer has a training sequence generating circuit 406 and a switching circuit 407 in addition to an input terminal 401, an adaptive equalizing circuit 402, a channel impulse response estimating circuit 403, a normal equation circuit 404, and an output terminal 405. The switching circuit 407 transfers to the channel impulse response estimating circuit 403 a training sequence from the training sequence generating circuit 406 during a predetermined period of time or the output signal of the adaptive equalizing circuit 402 during the other period of time. The training sequence insures the accurate estimation of the channel impulse response estimating circuit 403. This is successful in promoting rapid tuning of the estimating circuit 403 itself and that of the adaptive equalizing circuit 402.

Regarding the direct solution of the Eq. (15), the second type of adaptive equalizer described above is not practicable without increasing the amount of calculations, compared to the conventional adaptive equalizer. It, therefore, may occur that at the time of the high-rate transmission the symbol transmission interval expires before the solution of the normal equation ends. A third type of adaptive equalizer of the present invention has a thinning circuit for thinning channel impulse responses with respect to time so as to effect the calculation at an interval T$_1$ which is longer than the symbol interval T. Then, the normal equation circuit has only to end the calculation within the period of time T$_1$. This reduces the amount of calculations per time to T/T$_1$, compared to the case wherein the calculation is effected within the symbol interval T.

Figure 5:
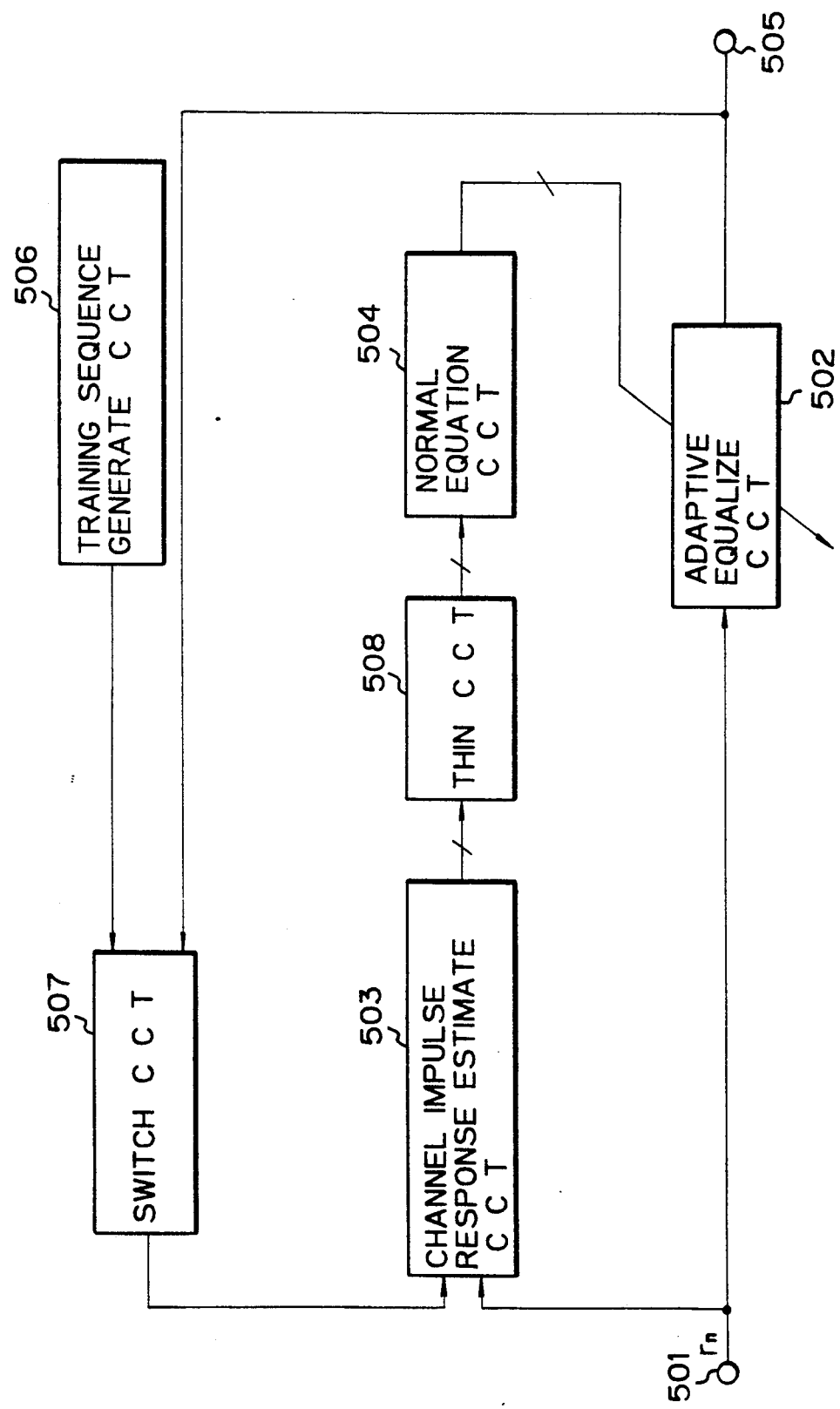
FIG. 5 is a block diagram schematically showing an embodiment of a third type of adaptive equalizer in accordance with the present invention.
Figure 6:
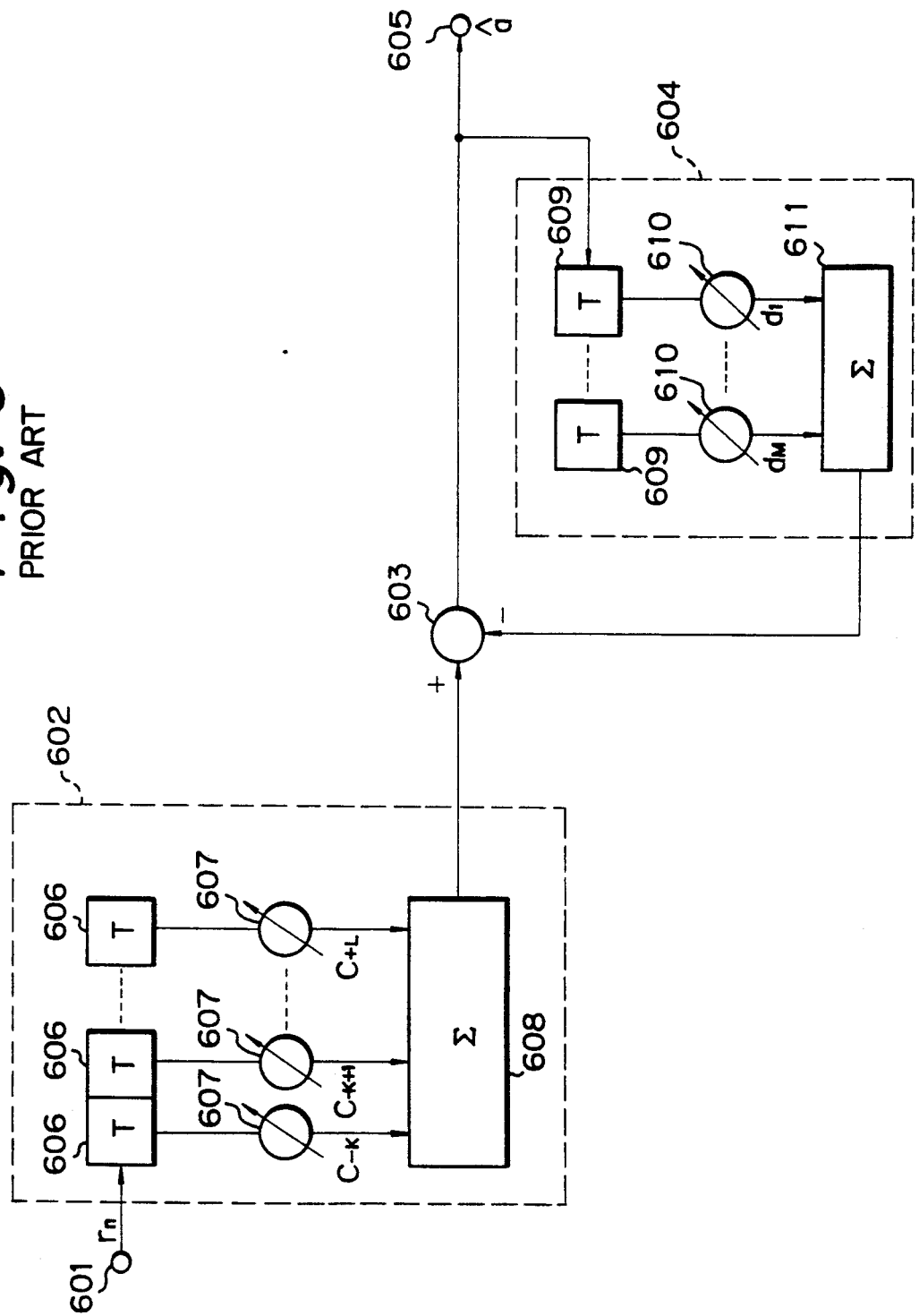
FIG. 6 is a block diagram schematically showing a conventional decision-feedback equalizer implemented as a transversal filter.

FIG. 5 shows an embodiment of such a third type of adaptive equalizer of the present invention. This embodiment, like the embodiment of FIG. 4, has an input terminal 501, an adaptive equalizing circuit 502, a channel impulse response estimating circuit 503, a normal equation circuit 504, a training sequence generating circuit 506, a switching circuit 507, and an output terminal 505. In addition, the embodiment has a thinning circuit 508 located just before the normal equation circuit 504. The thinning circuit 508 transfers, among the estimated channel impulse responses output by the channel impulse response estimating circuit, only the responses appearing at the interval T$_1$ longer than the symbol interval T to the normalizing equation circuit 504. The circuit 504, therefore, has only to end the solution of the normal equation within the period of time T$_1$. The tap coefficients of a transversal filter incorporated in the adaptive equalizing circuit 502 are the solutions of the tap coefficients determined by the normalizing equation circuit 504 and are updated every T$_1$.

The embodiments described above with reference to FIGS. 1 through 5 are implemented with the DFE shown in FIG. 7. If desired, the DFE may be replaced with a linear equalizer.

In summary, it will be seen that the present invention provides an adaptive equalizer which accurately updates the tap coefficients of a transversal filter incorporated therein in a predetermined period of time at all times with no regard to the condition of intersymbol interference on the transmission channel. Such an adaptive equalizer is advantageously applicable to, among others, terrestrial digital microwave communication in which the channel fluctuation is slow. Further, when provided with a thinning circuit, the adaptive equalizer implements the direct solution of a normal equation even at high-rate transmission.

Various modifications will become possible for those skilled in the art after receiving the teachings of the present disclosure without departing from the scope thereof.

What is claimed is:

1. An adaptive equalizer for adaptively equalizing a signal received over a channel on which intersymbol interference occurs, comprising:
   an adaptive equalizing circuit comprising a transversal filter and receiving the received signal;
   a channel impulse response estimating circuit for estimating an impulse response of the channel on the basis of the output signal of said adaptive equalizing circuit and the received signal; and
   a normal equation solving circuit for solving a normal equation determined by the channel impulse response estimated by said channel impulse response estimating circuit and tap coefficients of said transversal filter of said adaptive equalizing circuit;
   said tap coefficients of said transversal filter being updated by solutions of tap coefficients determined by said normal equation solving circuit.

2. An adaptive equalizer for adaptively equalizing a signal received over a channel on which intersymbol interference occurs, comprising:
   an adaptive equalizing circuit comprising a transversal filter and receiving the received signals;
   a training sequence generating circuit for generating a predetermined training sequence;
   a switching circuit responsive to said training sequence and the output signal of said adaptive equalizing circuit for outputting said training sequence during training or the output signal of said adaptive equalizing circuit after training;
   a channel impulse response estimating circuit for estimating an impulse response of the channel on the basis of the output signal of said switching circuit and the received signal; and
   a normal equation solving circuit for solving a normal equation determined by the channel impulse response estimated by said channel impulse response estimating circuit and tap coefficients of said transversal filter of said adaptive equalizing circuit;

said tap coefficients of said transversal filter being updated by solutions of tap coefficients determined by said normal equation solving circuit.

3. An adaptive equalizer for adaptively equalizing a signal received over a channel on which intersymbol interference occurs, comprising:

an adaptive equalizing circuit comprising a transversal filter and receiving the received signals;

a training sequence generating circuit for generating a predetermined training sequence;

a switching circuit responsive to said training sequence and the output signal of said adaptive equalizing circuit for outputting said training sequence during training or the output signal of said adaptive equalizing circuit after training;

a channel impulse response estimating circuit for estimating an impulse response of the channel on the basis of the output signal of said switching circuit and the received signal;

a thinning circuit for sampling channel impulse responses outputted by said channel impulse response estimating circuit at a time interval $T_1$ which is longer than a symbol interval $T$; and a normal equation solving circuit for solving within said time interval $T_1$ a normal equation determined by the channel impulse response outputted by said thinning circuit and tap coefficients of said transversal filter of said adaptive equalizing circuit;

said tap coefficients of said transversal filter being updated each said time interval $T_1$ by solutions of the tap coefficients determined by said normal equation solving circuit.

* * * * *